US012367215B2

(12) United States Patent
Bhattacharjee et al.

(10) Patent No.: US 12,367,215 B2
(45) Date of Patent: Jul. 22, 2025

(54) DATA SYNCHRONIZATION BETWEEN A PLURALITY OF DATA STORES

(71) Applicant: HONEYWELL INTERNATIONAL INC., Charlotte, NC (US)

(72) Inventors: Arnab Bhattacharjee, Bangalore (IN); Nikhil Bansal, Bangalore (IN); Srinivas Chintha, Coppell, TX (US); Vishnu Vardhana Reddy Potham, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/540,864

(22) Filed: Dec. 14, 2023

(65) Prior Publication Data

US 2025/0200068 A1 Jun. 19, 2025

(51) Int. Cl.
 *G06F 16/20* (2019.01)
 *G06F 16/27* (2019.01)
(52) U.S. Cl.
 CPC .................... *G06F 16/27* (2019.01)
(58) Field of Classification Search
 None
 See application file for complete search history.

(56) References Cited

U.S. PATENT DOCUMENTS

| 7,366,961 | B1 * | 4/2008 | Kovacevic | ........... H04N 21/434 |
| | | | | 714/701 |
| 2009/0157802 | A1 * | 6/2009 | Kang | .................... G06F 16/275 |
| | | | | 707/999.201 |
| 2022/0245143 | A1 * | 8/2022 | Tian | .................... G06F 16/2474 |

\* cited by examiner

*Primary Examiner* — Jau Shya Meng
(74) *Attorney, Agent, or Firm* — ALSTON & BIRD LLP

(57) ABSTRACT

Techniques for monitoring data synchronization among a plurality of data stores are described. In operation, a first statistic may be received for a first record set received over a first period of time at a first data store. A second statistic may then be obtained for the first record set received over the first period of time at a second data store. Based on the first statistic and the second statistic, a first intermediate state of synchronization may be ascertained between the first data store and the second data store. Further, a first metric associated with a second record set, received over a second period of time at the first data store, and a second metric associated with the second record set, received over the second period of time, may be determined. The determination may be based on the first intermediate state of synchronization. Based on the first metric and the second metric, a second intermediate state of synchronization between the first data store and the second data may be ascertained. Further, identification information of each of the records in the second record set, received at each of the first data store and the second data store, respectively, may be obtained. Based on the identification information, a final state of synchronization between the first data store and the second data store may be determined. Rendering of at least one indicator may be triggered accordingly for indicating the final state of synchronization.

20 Claims, 8 Drawing Sheets

DATA SYNCHRONIZATION BETWEEN A PLURALITY OF DATA STORES

BACKGROUND

A facility includes different equipment for performing various operations. For instance, an industrial facility may include equipment, such as sensors and feedback devices, to monitor different parameters. The parameters may be associated with, for example, operating conditions within the facility and operations associated with one or more machines located within the facility. Such equipment may generate data indicative of the parameters being monitored. The data may be collected and stored in one or more data stores. For example, the data may be stored in a data store and replicated on multiple other data stores to reduce risks related to loss of data due to failure of any of the data stores. Further, in one operation, the data may be obtained from one or more data stores for further processing. For instance, the data may undergo one or more data processing operations. In one example, one or more downstream computations may be performed, based on the data stored in multiple data stores, to assess or obtain different types of indicators. For example, the data may be obtained and processed to derive Key Performance Indicators (KPIs) indicating different parameters, and other information, related to different operations associated with the facility.

DETAILED DESCRIPTION

Figure 1A:
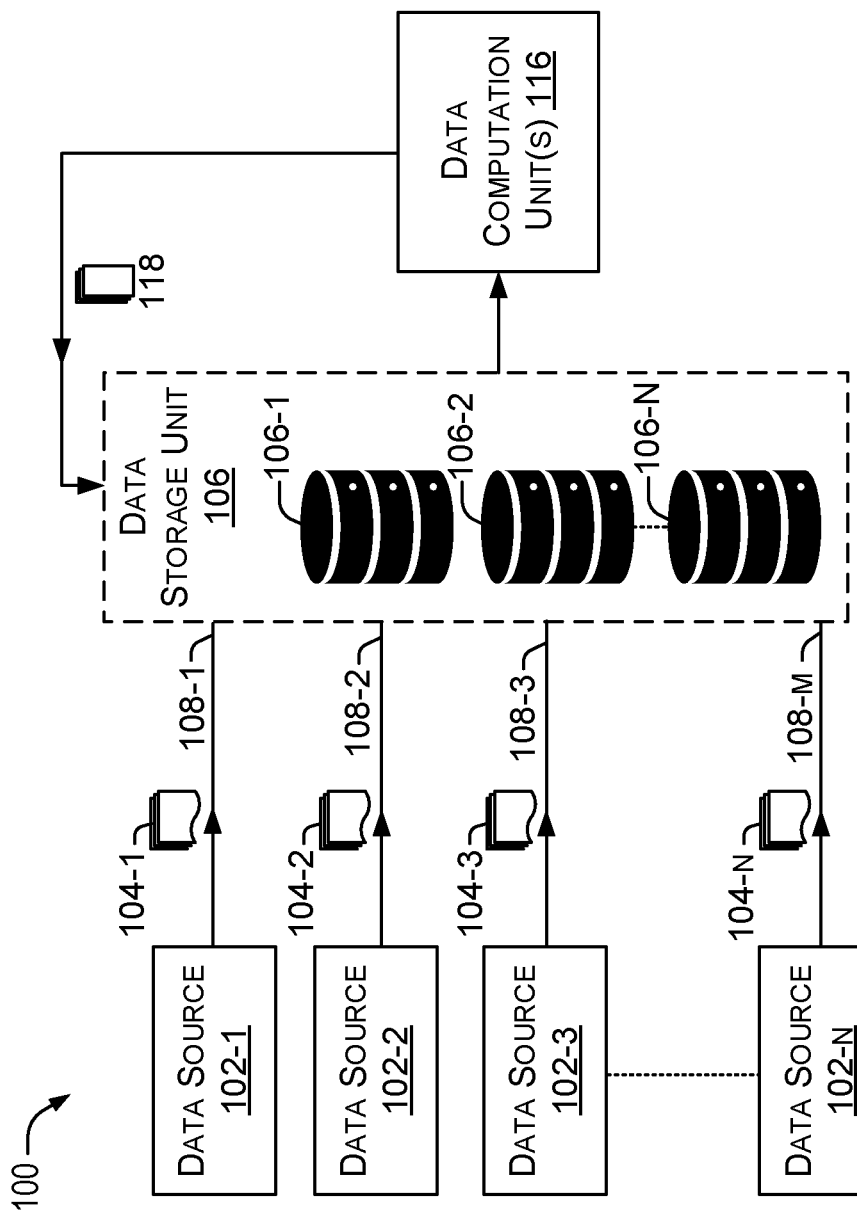
FIGS. 1A to 1C illustrates a computing environment comprising a plurality of data stores, in accordance with an example of the present subject matter.

Collection of data received from multiple equipment may be performed for multiple reasons. For example, facilities, such as industrial facilities, may include multiple monitoring equipment or devices that may generate data indicating different parameters. The parameters may be associated with, for example, operating conditions and operations associated with one or more machines located within, or associated with, the facility. In one example, the equipment may be sensors that may generate data indicative of different parameters required to be measured or monitored. The data, from the equipment, may thus be collected and stored over multiple data stores.

Further, in some instances, the data may be obtained, or received, from the data stores for performing different downstream computations. The computations may be performed, for example, to gain an insight into different parameters or indicators associated with the facility and/or the machines associated therewith. In one example, the data may be obtained for computing KPIs that may indicate a quantifiable measure of performance over time. The measure of performance may be associated with, for instance, any operation or machine associated, directly or indirectly, with one or more facilities. In another example, the data may be obtained by various data processing tools or applications for organizing data and/or generating relevant information for being used by a user, such as staff of the facility. For example, the data may be obtained for performing complex data processing jobs and/or generating different data visualizations.

Generally, the equipment may be located at different locations within, or around, premises of the facility. Thus, the data being generated may have to travel through different paths or pipelines before being received by the data stores. In some instances the data may also undergo different data processing operations before being stored in some of the data stores. For instance, the data may undergo filtering, normalization, noise reduction, and other data processing operations before being stored in the data stores.

However, there may be several challenges that may be associated with data consistency between multiple data stores. For instance, one or more data stores may have different characteristics, such as rates at which they may perform read and write operations. That is, some of the data stores may have faster data ingestion and retrieval capabilities as compared to the other data stores. Multiple data stores may thus face data consistency, or synchronization, challenges between the data stored therein at a particular point in time. Further, as the data may travel through different pipelines, some of which may include one or more data processing operations, some of the data stores may experience delayed reception of data as compared to the other data stores. Thus, at a given point in time, different data stores may receive, and have stored therein, different data, thereby introducing data consistency challenges.

Also, failure of any of the pipelines and/or the data processing operations may increase the chances of losing data before it reaches some of the data stores. Therefore, data stored across multiple data stores may lack consistency as some of the data stores may not include complete data. Thus, in such scenarios, one or more data stores may be desynchronized with each other.

Further, in many instances, as the data may be obtained from multiple data stores for performing different downstream computations, such as the KPI calculations, the computations may also turn out to be inconsistent or inaccurate. For instance, as some data stores may experience delayed data reception, some data stores may have different or incomplete data at a given point in time. Since the data stored across different data stores may be inconsistent, and the indicators may be derived based on the available inconsistent data, the indicators may turn out to be inaccurate in indicating the industrial processes and assets.

Furthermore, where reception of data at one or more data stores may be delayed, and when the delayed data arrives after the downstream computations, such as after performing the KPI calculation, re-computation of the indicators may be desired, to obtain updated indicators considering the received data.

According to examples of the present subject matter, techniques for determining consistency of data between a plurality of data stores in a computing environment are described.

In an example implementation, the computing environment may include a plurality of data stores. A first statistic may be received from a first data store, amongst the plurality of data stores. The first statistic may be received, in one example, in response to receipt of a first record set at the first data store. The first record set may include one or more records received from one or more data sources, for example, data received from equipment deployed within an industrial facility. Further, the first statistic may indicate, in one example, a number of records in the first record set received at the first data store over a first period of time. The first period of time may be, for example, an hour. In this example, the first statistic may indicate, for instance, 10 records, in the first record set, were received by the first data store over an hour. Further, a second statistic may be obtained from a second data store, from amongst the plurality of data stores. In one example, the second statistic may be obtained in response to receiving the first statistic. The second statistic may indicate a number of records received in the first record set by the second data store over the first predefined period of time.

A comparative assessment may then be performed between the first statistic and the second statistic to ascertain a first intermediate state of synchronization between the first data store and the second data store. That is, the number of records, in the first record set received at the first and the second data stores, may be compared to determine whether both data stores received the same number of records. In one example, if the number of records in the first record set received at the second data store is in accordance with the first data store, or vice versa, it may be ascertained that the first data store and the second data store are in the first intermediate state of synchronization. However, if the number of records in the first record set received at the first and the second data stores are determined to be inconsistent with each other, it may be ascertained that both the data stores are not in the first intermediate state of synchronization.

Based on the first intermediate state of synchronization, a first metric and a second metric may be determined. In one example, the first metric may indicate a number of records in a second record set received over the second period of time at the first data store. The second record set may include one or more records that may be derived based on the first record set received by, say, the first data store. For example, the second record set may include records, such as one or more KPIs, that may be derived by one or more data computation unit(s) based on the records received from data sources and present in the first record set received by the first data store. Further, the second metric may indicate a number of records in the second record set received over the second period of time at the second data store.

Based on the first metric and the second metric, a second intermediate state of synchronization may be ascertained. That is, the number of records, in the second record set received at the first and the second data stores, may be compared to determine whether both data stores received the same number of records in the second record set. For example, a comparison between the first and the second metrics may indicate whether both the data stores received an equal number of KPIs over the second period of time. If the number of records in the second record set received at the second data store is in accordance with the first data store, or vice versa, it may be ascertained that the first data store and the second data store are in the second intermediate state of synchronization. However, if the number of records in the second record set received at the first and the second data stores are determined to be inconsistent with each other, it may be ascertained that both the data stores are not in the second intermediate state of synchronization.

Upon ascertaining that both the data stores are in the second intermediate state of synchronization, identification information associated with each of the records in the second record set received at the first data store and at the second data store may be obtained. Each of the records in the second record set may have identification information. In one example, each of the records in the second record set may have a unique identification number associated therewith. The identification information for the records in the second record set received at the first data store and the second data store may be compared to ascertain whether the same records have been received at the first and the second data stores. By comparing the identification information, a unique record, that may be present among one of the first and the second data stores, may be identified while the unique record may be missing on other of the first data store and the second data store. Accordingly, a final state of synchronization between the first data store and the second data store may be determined. For instance, on ascertaining that the unique record is present on one of the first data store and the second data store, while the unique record is missing on the other of the first data store and the second data store, it may be ascertained that the first and the second data stores may not have received same records and are thus unsynchronized. However, on ascertaining that no unique record is present on either of the first and the second data stores, it may be ascertained that the first and the second data stores received same records and are thus synchronized with each other. Accordingly, rendering of at least one indicator may be triggered to indicate whether the first and the second data stores are synchronized.

Further, in one example implementation, the present subject matter also discloses recalculation or rederivation of records in the second record set. For example, it may be determined whether a record in the first record set was received after a record in the second record set has been derived, based on the existing records in the first record set. That is, it may be determined whether one or more records in the second record set were derived based on the records that existed in the first record set. In such instances, it may be determined that an updated record for the second record set is required to be derived based on the newly received record in the first record set.

The present subject matter, in one example implementation, thus discloses a hierarchy of synchronization checks to be performed in order to determine whether the data stores are synchronized with each other. The hierarchy of checks may assist in identification of faults, or desynchronization, at different levels. For instance, at a first level check (i.e., first intermediate state of synchronization), it is determined whether the data stores received equal number of records from the data sources. In case it is determined that the number of records is not equal, it may be determined that some of the data stores may not have received the records from the data sources. Thus, a fault may be ascertained between the data sources and the data stores.

However, upon compliance with the first level check, a second level check (i.e., the second intermediate state of synchronization) may be performed to determine whether the data stores received same number of records (for example, KPIs) being derived based on the records in the first record set. As the records in the second record set may be derived and then stored in the data stores, it may be possible that the records may undergo multiple intermediate downstream computations, for example, by the data computation unit(s), and then be received at the data stores. In case it is determined that the number of records in the second record set at the first and the second data stores is not equal, it may be determined that some of the data stores may not have received the records from the data computation unit(s). Thus, a fault may be ascertained between the data computation unit(s) and the data stores. By identifying the level of occurrence of the fault, it may become less time, process, and effort consuming to identify a remedy to resolve the fault.

Also, by determining the number of records in the second record set, it may be determined whether the data stores received the same number of records after further processing of the records. That is, it may be determined that both the data stores store an equal number of records even after the performance of different downstream computations, thereby indicating that there may not be a probable loss of computationally processed records at multiple data stores.

Furthermore, on compliance with the second level check, a third level check (i.e., the final state of synchronization) may be performed to determine whether the records in the second record set received by the data stores are the same. In some instances, it may be possible that the data stores received the same number of records, however, the records may be distinct or different among the data stores. Such scenarios may also be a possible reason for inconsistency between the data stores. Thus, in the third level check, the records in the second record set, received by the data stores, are analyzed to determine whether any distinct or unique record has been received by at least one of the data stores. In one example, the check may be performed by comparing identification information associated with each of the records in the second record set. Based on the comparison, it may be determined whether any of the data stores received one or more records in the second set that may be missing among the records, in the second record set, received by any other data store. Accordingly, the final state of synchronization may be determined for the data stores. The final state may indicate whether the data stores are in accordance with each other. In case it is determined that the records in the second record set are different, in at least one of the data stores, it may be ascertained that the records may not have been communicated, or provided, to the at least one of the data stores by other data stores. Thus, a fault may be ascertained in communication of records in the second record set to one of the data stores.

Additionally, by providing the hierarchy of checks, accuracy in determining synchronization between the data stores may be improved at different levels. Further, the amount of processing may be reduced as no further checks are required to be performed if synchronization failure is determined at any intermediate level, say the first intermediate state of synchronization.

Further, in one example implementation, the present subject matter also discloses recalculation or rederivation of records in the second record set. In one example, upon determining that a record in the first record set was received after a record in the second record set has been derived, recalculation of one or more records in the second record set may be recommended. Since there may be multiple reasons for delayed reception of records, as discussed above, and as records in the second record set are received based on records in the first record set, computation of one or more records in the second record set may be recommended. As the computation may be performed even by considering the delayed records, the accurateness of the records in the second record set may be improved.

The above techniques are further described with reference to FIGS. 1A to 6. It would be noted that the description and the figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

Figure 1B:
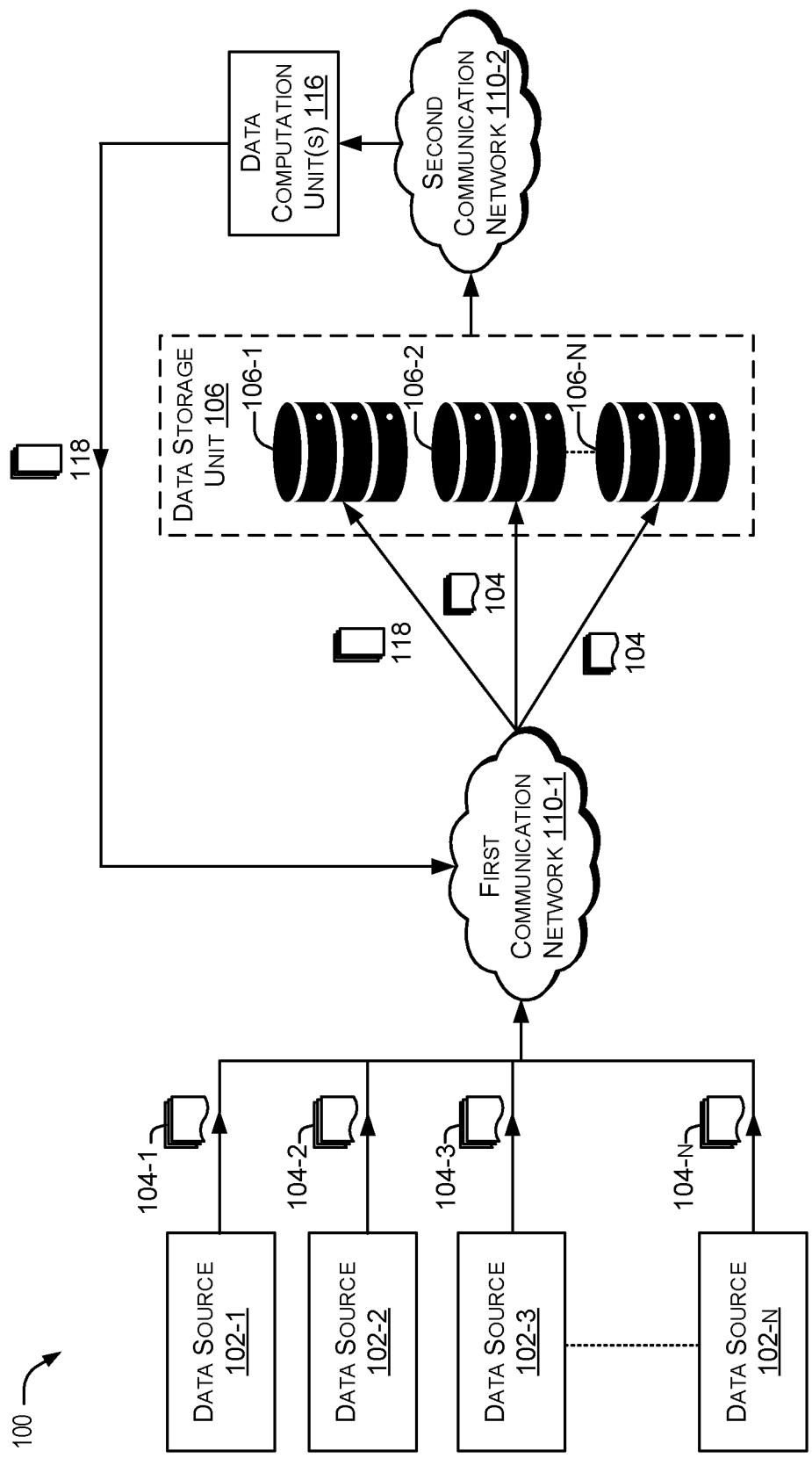
Figure 1C:
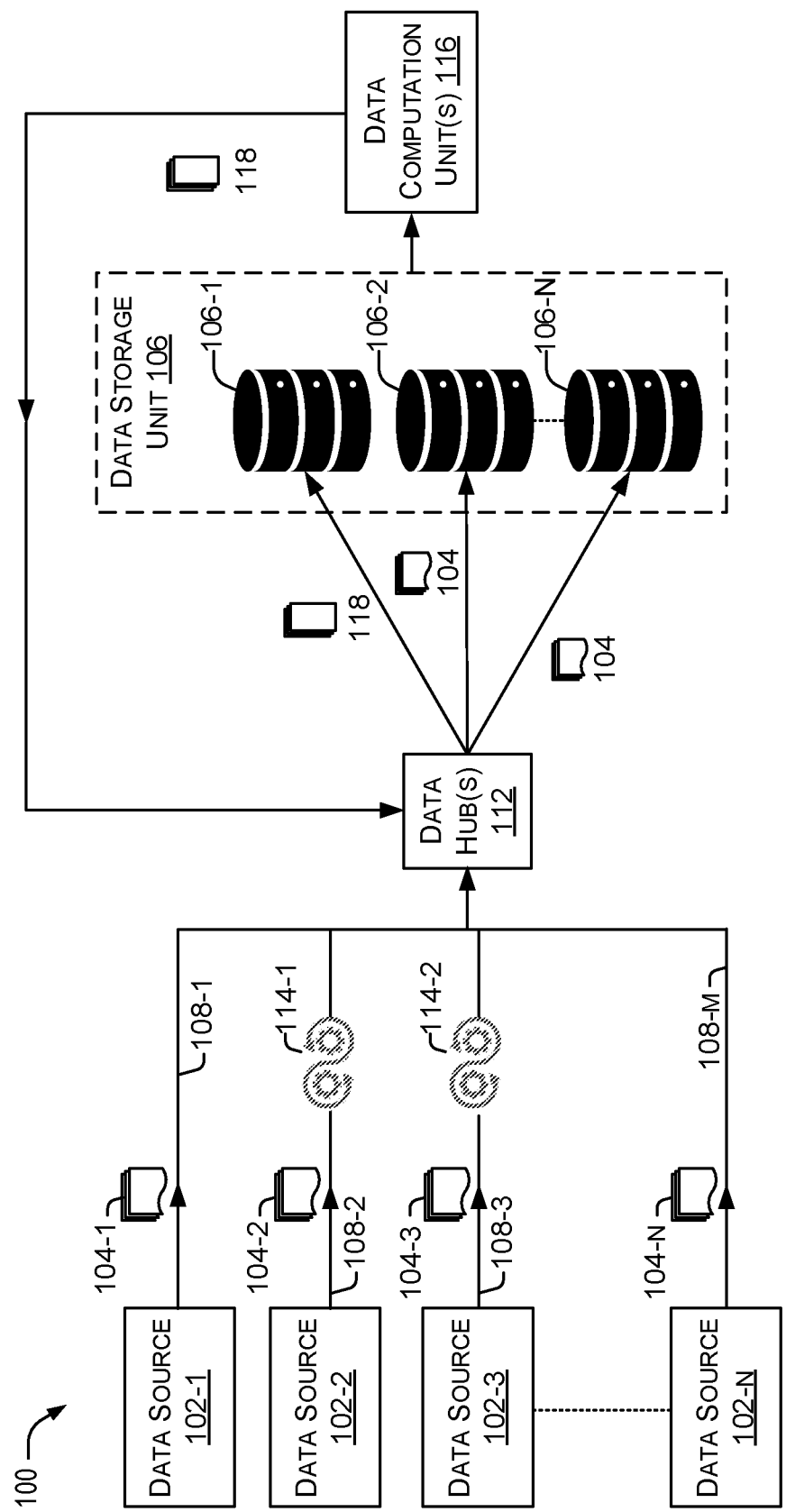

FIGS. 1A to 1C illustrates a computing environment 100 comprising a plurality of data stores, in accordance with an example of the present subject matter.

In one example, the computing environment 100 may be a connected computing environment associated with an industrial facility. The facility may include any industrial facility or a combination of interconnected industrial facilities. Examples of the facility may include, but are not limited to, a manufacturing facility, a healthcare facility, a data center, food manufacturing and processing facility, data warehouse, and chemical processing facility. In another example, computing environment 100 may be a distributed computing environment associated with one or more industrial facilities that may be geographically distributed and/or host one or more service platforms for customers. Examples of such platforms may include, but are not limited to, e-commerce platforms, gaming platforms, financial services platforms, data storage platforms, and platforms providing/hosting services related to Artificial Intelligence (AI), Machine Learning (ML), Large Language model (LLM), deep learning, and neural network.

In one example, the computing environment 100 may include a plurality of data sources 102-1, 102-2, 102-3, . . . , 102-n, where n is a natural number. For the sake of reference, the plurality of data sources 102-1, 102-2, 102-3, . . . , 102-n may hereinafter individually be referred to as a data source 102 and collectively be referred to as data sources 102. Examples of the data sources 102 may include, but are not limited to, sensors, microservices, software applications, web pages, servers, actuators, data storage devices, computing devices, and Internet of Things (IoT) devices.

The data sources 102 may generate data, hereinafter referred to as records 104. The records 104 may be indicative of, in one example, different parameters being monitored by the data sources 102. The parameters may be associated with, for example, operating conditions and operations associated with one or more machines located within, or associated with, an industrial facility. For example, the data source 102-1 may be a temperature sensor that may generate data or record 104-1 indicating temperature within the industrial facility, the data source 102-2 may be a humidity sensor that may generate record 104-2 indicating humidity level within the industrial facility, the data source 102-3 may be a vibration sensor that may generate record 104-3 indicating a vibration level associated with a machine located in premises of the industrial facility, and the data source 102-3 may be a pressure sensor that may generate record 104-n indicating a pressure range associated with one or more machinery located within, or associated therewith, premises of the industrial facility.

While a few examples of data sources 102 and the records 104 have been discussed, the above examples are not to be considered limiting. Other examples of the data sources 102 may also be considered. For example, the data sources 102 may include sources of data, such as one or more storage devices having, stored therein, the records 104. Examples of the data sources 102 may further include, but are not limited to, load monitoring units that may generate data or records indicating network traffic and one or more data storage devices that may generate records indicating an available amount of storage.

In one example, the computing environment 100 may further include data storage unit 106. The data storage unit 106 may include a plurality of data stores. For example, the data storage unit 106 may include a first data store 106-1, a second data store 106-2, . . . , and a Nth data store 106-N, where N is a natural number. In one example, the data storage unit 106 may be implemented by a physical data storage device or server capable of storing data, including the records 104. In this example, the data stores 106-1, 106-2, . . . , and 106-N may be virtual data stores being implemented over the physical data storage device.

In another example, each of the data stores 106-1, 106-2, . . . , and 106-N may be implemented by an individual physical data storage device, collectively forming the data storage unit 106. In one example, each of the data stores 106-1, 106-2, . . . , and 106-N may have different characteristics. For example, the first data store 106-1 may be a fast data store with capabilities to perform fast data read and write operations, whereas the second data store 106-2 may have capabilities to perform slower data read and write operations as compared to the first data store 106-1. Similarly, in one example, each of the data stores 106-1, 106-2, . . . , and 106-N may have different memory capacities and support different standards. The data stores 106-1, 106-2, . . . , and 106-N may also differ in type of storage they offer for storing data, such as the records 104. For example, the first data store 106-1 may be a temporary data store that may temporarily store data, including the records 104. Whereas the second data store 106-2 may be a permanent data store that may permanently store data. Further, in yet another example, the data storage unit 106 may be implemented over a cloud-based platform. Also, in one example, the data stores 106-1, 106-2, . . . , and 106-N may be geographically distributed and may collectively form the data storage unit 106. Each of the data stores 106-1, 106-2, . . . , and 106-N may be, in one example, communicably coupled with each other. For example, each of the data stores may be communicably coupled for sharing data, including the records 104, amongst each other.

Further, the data stores 106-1, 106-2, . . . , and 106-N may be communicably coupled with the data sources 102. The data stores 106-1, 106-2, . . . , and 106-N may be communicably coupled, in one example, to receive and store the records 104 from the data sources 102. The data stores 106-1, 106-2, . . . , and 106-N may be communicably coupled with the data sources 102, in one example, through communication channels or data pipelines 108, as illustrated in FIG. 1A. As the data sources 102, for example, may be located at different locations, geographically or within the facility, each of the data sources 102 may be communicably coupled with the data storage unit 106, and thereby the data stores 106-1, 106-2, . . . , and 106-N, through a data pipeline. For example, the data source 102-1 may be communicably coupled with the data storage unit 106 through a first data pipeline 108-1, the data source 102-2 may be communicably coupled with the data storage unit 106 through a second data pipeline 108-2, the data source 102-3 may be communicably coupled with the data storage unit 106 through a third data pipeline 108-3, and the data source 102-N may be communicably coupled with the data storage unit 106 through a $m^{th}$ data pipeline 108-$m$, where m is a natural number. The data pipelines 108-1, 108-2, . . . , 108-$m$ may hereinafter individually be referred to as data pipeline 108 and collectively be referred to as data pipelines 108.

In another example, the data sources 102 may be communicably coupled with the data storage unit 106, and thereby the data stores 106-1, 106-2, . . . , and 106-N, though a first communication network 110-1, as illustrated in FIG. 1B. The first communication network 110-1 may be a wireless or a wired network, or a combination thereof. The first communication network 110-1 can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, $5^{th}$ Generation New Radio network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the first communication network 110-1 may include various network entities, such as gateways and routers, however, such details have been omitted to maintain the brevity of the description.

In yet another example, the data sources 102 may be communicably coupled with the data storage unit 106, and thereby the data stores 106-1, 106-2, . . . , and 106-N, though one or more data hub(s) 112, as illustrated in FIG. 1C. The data hub(s) 112, in one example, may be interface(s) that may communicably couple the data stores 106-1, 106-2, . . . , and 106-N with the data sources 102. The data hub 112, in some instances, may also be configured to direct network traffic, including the records 104, to any of the data stores or one or more selected data stores from among the data stores 106-1, 106-2, . . . , and 106-N.

Further, in one example, the records 104 from the data sources 102 may undergo different data processing operations before being received by the data stores. As illustrated in FIG. 1C, data pipelines 108-2 and 108-3 may include data processing engines 114-1 and 114-2, respectively. The data processing engines 114-1 and 114-2 may be configured to process the data, such as the records 104, generated by the data sources 102-2 and 102-3. For instance, the data processing engines 114-1 and 114-2 may perform filtering, normalization, noise reduction, and other data processing operations before the records 104 are received by the data storage unit 106, and thereby the data stores 106-1, 106-2, . . . , 106-N. The processed records 104 may then be received by the data storage unit 106, and thereby the data stores 106-1, 106-2, . . . , 106-N.

In one example, the computing environment 100 may further include one or more data computation unit(s) 116. The data computation unit(s) 116 may be communicably coupled with the data storage unit 106, and thereby the data stores 106-1, 106-2, . . . , and 106-N. In one example, the data computation unit(s) 116 may be communicably coupled through a direct communication link, as illustrated in FIGS. 1A and 1C. In another example, the data computation unit(s) 116 may be communicably coupled with the data storage unit 106 through a second communication network 110-2, as illustrated in FIG. 1B. The second communication network 110-2, in one example, may be similar to the first communication network 110-1.

The data computation unit(s) 116 may receive the records 104 from the data storage unit 106 for performing one or more downstream computations. In one example, the data computation unit(s) 116 may include multiple data computation engines (not shown) that may be configured to perform downstream computations based on the data, such as the records 104, stored in the data stores 106-1, 106-2, . . . , and 106-N. The data computation engines may be configured to obtain records 104 from the data stores and process the records 104 to generate different types of processed outputs, such as indicators that may indicate different parameters, along with other information, related to different operations associated with the facility. In one example, the indicators may be mathematical functions or mathematical products, derived based on the records 104, that may indicate different parameters associated with one or more operations. The indicators may be, in one example, KPIs associated with one or more operations. The output from the data computation unit(s) 116 may thus be data and may hereinafter be referred to as records 118.

In one example, the data computation unit(s) 116 may be configured to perform downstream computations according to pre-defined conditions or configurations. In one example, the pre-defined conditions or configurations may be defined by a user, such as staff associated with the facility, through a user interface (not shown). For instance, a calculation time interval may be defined for the data computation unit(s) 116 to perform downstream computations and generate the records 118. The data computation unit(s) 116 may perform downstream computations as per the defined calculation time interval. For example, the user may define a number of KPIs to be computed by the data computation unit(s) 116. In another example, the user may define a rate to derive or generate the records 118, i.e., a number of KPIs to be computed by the data computation unit(s) 116 per unit time. The per unit time may be defined, for example, in minutes, hours, or days.

In another example, the data computation engines may be software applications that may access the records 104 stored in the data stores 106-1, 106-2, . . . , and 106-N to generate informative representations for the user, such as staff associated with the facility. For example, the data computation engines may obtain the records 104 and accordingly process, arrange, and/or generate graphics providing insightful information based on the records 104.

Further, the data computation unit(s) 116 may be communicably coupled with the data storage unit 106. In one example, the data computation unit(s) 116 may be communicably coupled with the data storage unit 106 through the data hub(s) 112, as illustrated in FIG. 1C. The data hub(s) 112 may direct the records 118 to the data storage unit 106, and thereby the data stores 106-1, 106-2, . . . , and 106-N. In another example, the data computation unit(s) 116 may be communicably coupled with the data storage unit 106 through the first communication network 110-1, as illustrated in FIG. 1B. In another example, the data computation unit(s) 116 may be in direct communication with the data storage unit 106, as illustrated in FIG. 1A.

The data computation unit(s) 116 may send the records 118, in one example, for being stored in each of the data stores 106-1, 106-2, . . . , 106-N. The data storage unit 106 may accordingly broadcast the records 118 to each of the data stores. In another example, data computation unit(s) 116 may send the records 118 to the first data store 106-1. The first data store 106-1 may store the records 118 and, in response to reception of the records 118, send the records 118 for being stored at the second data store 106-2, and the Nth data store 106-N via the first communication network 110-1 or the data hub(s) 112.

Further, in one example, each of the data stores may maintain a database indicating details associated with data being received and stored therein. The database may be, in one example, in the form of a log indicating details associated with data being received and stored therein. For example, the data stores may maintain the log indicating identification information associated with each of the records 104 and records 118. The identification information may include, for example, a unique identification number associated with each of the records 104 and records 118. For instance, each of the records 118, such as the KPIs, may have a unique identification number associated therewith. Similarly, each of the records 104, received from the data sources 102, may have a unique identification number associated therewith.

The identification number may be assigned with each of the records 104 and 118 using different techniques. In one example, an identification number may be assigned randomly to each of the records 104 and records 118 as they are generated by the data sources 102 and the data computation unit(s) 116, respectively. In another example, an identification number may be assigned to each of the records 104 and records 118 based on the order in which they are generated by the data sources 102 and the data computation unit(s) 116, respectively.

Further, in one example, the details associated with data may further include timestamps associated therewith. For example, each of the records 104 and the records 118 may have corresponding record timestamps associated therewith. The record timestamps may indicate, in one example, a time of reception of each of the records 104 and records 118 at the corresponding data stores. Furthermore, in one example, the details associated with data may also include a total count indicating an aggregate number of records that may have been received, and/or stored, at each of the data stores.

The manner in which data consistency between the plurality of data stores may be utilized is described with reference to the forthcoming figures.

Figure 2:
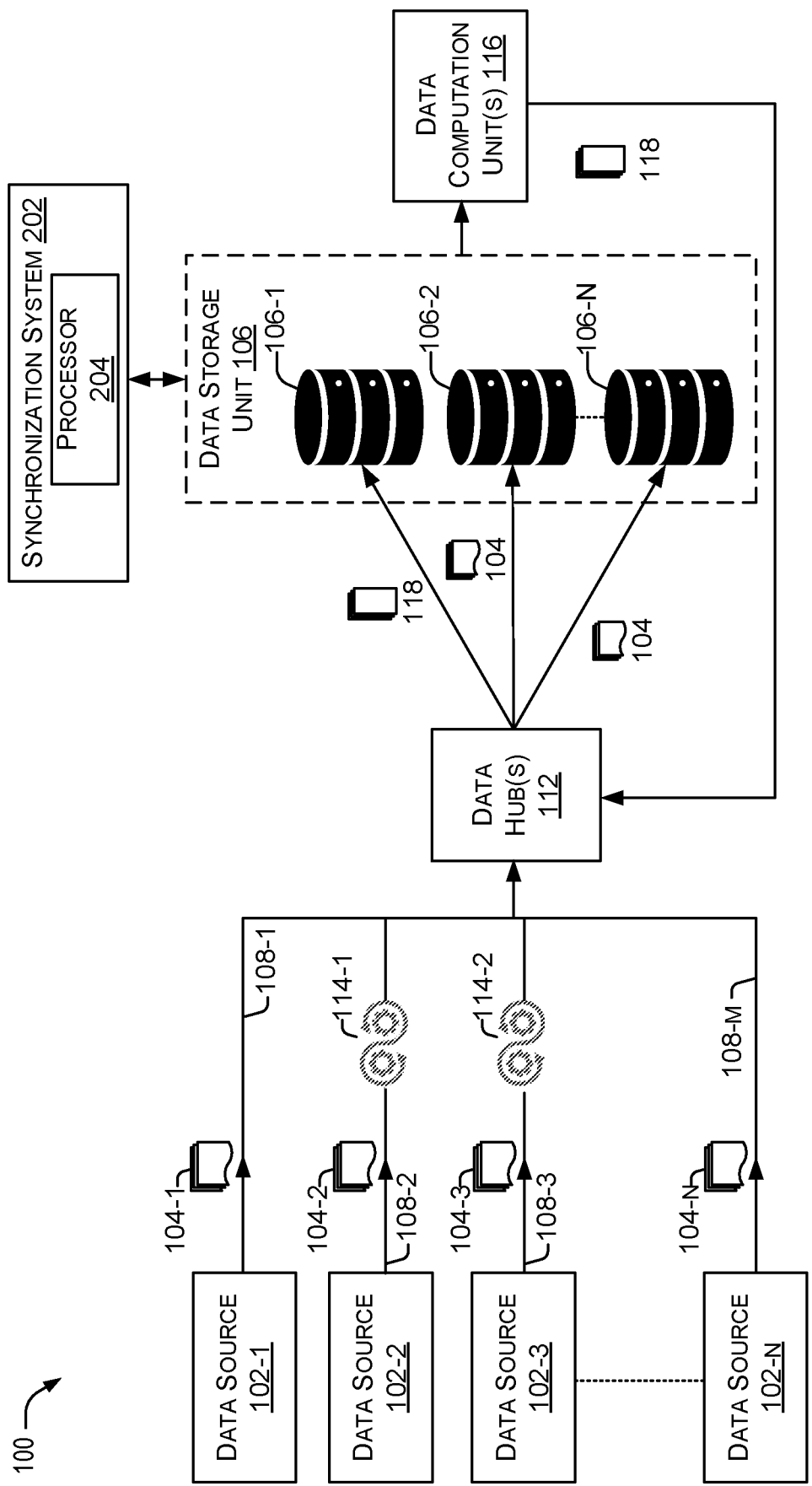
FIG. 2 illustrates a computing environment including a synchronization system, in accordance with an example of the present subject matter.

FIG. 2 illustrates a computing environment 200 including a synchronization system 202, in accordance with an example of the present subject matter. In one example, the computing environment 200 may be similar to the computing environment 100 discussed with reference to FIGS. 1A to 1C. For example, the computing environment 200 may also include the data sources 102 generating the records 104, the data storage unit 106 communicably coupled with the data sources 102, and the data computation unit(s) 116 communicably coupled with the data storage unit 106.

In one example implementation, the computing environment 200 may further include the synchronization system 202. In one example, the synchronization system 202 may be configured to monitor synchronization between a plurality of data stores, such as the first data store 106-1, the second data store 106-2, . . . , and the $N^{th}$ data store 106-N. The synchronization system 202 may be communicably coupled with the data storage unit 106, as illustrated in FIG. 2. That is, synchronization system 202 may be communicably coupled with the data stores 106-1, 106-2, . . . , and 106-N for monitoring synchronization therebetween. In another example, the synchronization system 202 may be communicably coupled with one of the data stores 106-1, 106-2, . . . , and 106-N. For example, the synchronization system 202 may be communicably coupled with the second data store 106-2 for monitoring synchronization of the second data store 106-2 with other data stores, such as the data stores 106-1 and 106-N.

Though illustrated as communicably coupled with the data storage unit 106, the synchronization system 202 may also be communicably coupled with other components of the computing environment 200. Also, in one example, the synchronization system 202 may be implemented over one or more of the data stores 106-1, 106-2, . . . , and 106-N. For example, the synchronization system 202 may be implemented on the second data store 106-2.

In one example, the synchronization system 202 may include a processor 204. The processor 204 may be implemented, for example, as a dedicated processor, a shared processor, or a plurality of individual processors, some of which may be shared. Examples of the processor 204 may include, but are not limited to, microprocessors, microcomputers, microcontrollers, digital signal processors, central processing units, state machines, logic circuitries, and/or any other devices that manipulate signals and data based on computer-readable instructions. The processor 204 may also be, for example, logical circuitries implementing artificial intelligence, machine learning models, deep learning models, or neural networks. In one example, the processor 204 may be a functional block. For example, the processor 204 may be a programmed computing engine implementing a software workflow or job over one or more of the data stores 106-1, 106-2, . . . , and 106-N. For example, the processor 204 may be a software workflow being implemented on the second data store 106-2.

In one example implementation, the synchronization system 202 may implement techniques for determining consistency of data between a plurality of data stores. The processor 204 may receive a first statistic, say, from the first data store 106-1. The first statistic may be received, in one example, in response to receipt of a first record set at the first data store. The first record set may include one or more of the records 104 received from the data sources 102. Further, the first statistic may indicate, in one example, a number of records 104 in the first record set received at the first data store over a first period of time. The first period of time may be, for example, 30 minutes.

Further, the processor 204 may obtain a second statistic from, say, the second data store 106-2. In one example, the second statistic may be obtained in response to receiving the first statistic. The second statistic may indicate a number of records 104 received in the first record set by the second data store 106-2 over the first predefined period of time.

Based on the first statistic and the second statistic, the processor 204 may ascertain a first intermediate state of synchronization between the first data store 106-1 and the second data store 106-2. In one example, the processor 204 may compare the first statistic and the second statistic to ascertain whether the first data store 106-1 and the second data store 106-2 comply with the first intermediate state of synchronization. In one example, the processor 204 may compare the first and the second statistics to determine whether the number of records 104, in the first record set, received at the first and the second data stores are in accordance with each other.

In one example, if the processor 204 determines that the number of records 104 in the first record set received at the second data store is in accordance with the first data store, the processor 204 may ascertain that the first data store 106-1 and the second data store 106-2 are in the first intermediate state of synchronization. However, if the processor 204 determines that the number of records 104 in the first record set received at the first and the second data stores are inconsistent with each other, the processor 204 may ascertain that both the data stores are not in the first intermediate state of synchronization.

Based on ascertaining the first intermediate state of synchronization, the processor 204 may determine a first metric and a second metric. In one example, the first metric may indicate a number of records 118 in a second record set received over the second period of time at the first data store 106-1. The second record set may include one or more of the records 118 that may be derived based on records 104 in the first record set received by the first data store 106-1. For example, the second record set may include records 118, such as one or more KPIs, that may be derived by the data computation unit(s) 116 based on the records 104 received from data sources 102 and present in the first record set received by the first data store 106-1. Further, the second metric may indicate a number of records 118 in the second record set received over the second period of time at the second data store 106-2.

Based on the first metric and the second metric, the processor 204 may ascertain a second intermediate state of synchronization. For example, the processor 204 may compare the number of records 118, in the second record set received at the first and the second data stores. The comparison may be performed to determine whether both the data stores received the same number of records 118 in the second record set. For example, a comparison between the first and the second metrics may indicate whether both the data stores received an equal number of KPIs over the second period of time. If the processor 204 determines that the number of records 118 in the second record set received at one of the data stores, say, the second data store 106-2 is in accordance with the first data store 106-1, the processor 204 may ascertain that the first data store 106-1 and the second data store 106-2 are in the second intermediate state of synchronization. However, if the processor 204 determines that the number of records 118 in the second record set received at the first and the second data stores are inconsistent with each other, the processor 204 may ascertain that both the data stores may not be in the second intermediate state of synchronization.

Upon ascertaining that both the data stores are in the second intermediate state of synchronization, the processor 204 may obtain identification information associated with each of the records 118 in the second record set received at the first data store 106-1 and at the second data store 106-2. Each of the records 118 in the second record set may have a unique identification information. For instance, each of the records 118 in the second record set may have a unique identification number associated therewith. The identification information for the records 118 in the second record set received at the first data store 106-1 and the second data store 106-2 may be compared to ascertain whether the same records have been received at the first and the second data stores.

By comparing the identification information, the processor 204 may identify whether a unique record is present among one of the first and the second data stores, while the unique record may be missing on other of the first data store 106-1 and the second data store 106-2. Accordingly, the processor 204 may determine a final state of synchronization between the first data store 106-1 and the second data store 106-2. For instance, on ascertaining that the unique record is present on one of the first data store 106-1 and the second data store 106-2, while the unique record is missing on the other of the first data store 106-1 and the second data store 106-2, the processor 204 may ascertain that the first and the second data stores may not have received same records 118 and are thus unsynchronized. However, on ascertaining that no unique record is present on either of the first and the second data stores, the processor 204 may ascertain that the first and the second data stores may have received the same records 118 and are thus synchronized with each other.

Further, the processor 204 may trigger rendering of at least one indicator to indicate whether the first and the second data stores are synchronized. For example, the processor 204 may trigger rendering of a sync state indicator to indicate that the first data store 106-1 and the second data store 106-2 may be synchronized with each other. In one example, the processor 204 may trigger rendering of the sync state indicator on the user interface (not shown). Also, the processor 204 may trigger rendering of an async state indicator to indicate that the first data store 106-1 and the second data store 106-2 may be unsynchronized with each other.

Though monitoring synchronization has been discussed with reference to the first data store 106-1 and the second data store 106-2, the above synchronization can also be monitored, by the synchronization system 202, for other data stores of the data storage unit 106 in a similar manner.

Further, in one example, the processor 204 may also recommend recalculation or rederivation of one or more records 118 in the second record set. For example, the processor 204 may determine whether one or more records in the first record set were received after one or more records in the second record set have been derived. That is, the processor 204 may determine whether a new record 104 has been received that may not have been used for deriving one or more records 118 in the second record set, as the records 118 have been derived earlier than reception of the new record 104. In such instances, the processor 204 may determine that an updated record 118 for the second record set is required to be derived based on the newly received record 104 in the first record set.

The present subject matter, in one example implementation, thus discloses a hierarchy of synchronization checks to be performed in order to determine whether the data stores are synchronized with each other. The hierarchy of checks may also assist in identification of faults, or desynchronization, at different levels, as discussed above. Further, the amount of processing may be reduced as no further checks are required to be performed if synchronization failure is determined at any intermediate level, say the first intermediate state of synchronization. Further, by recalculation or rederivation of records in the second record set, the accuracy of the records in the second record set may be improved.

Figure 3:
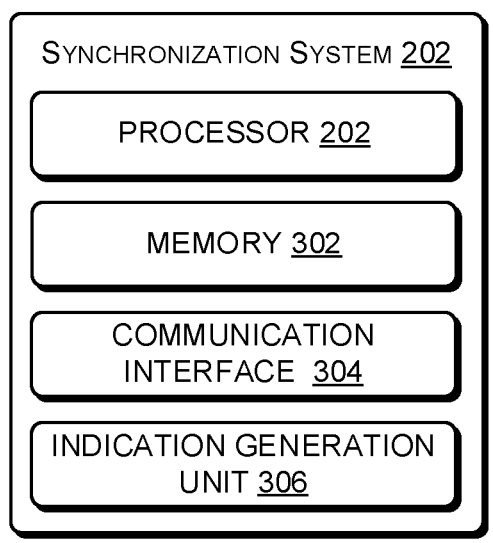
FIG. 3 illustrates a block diagram of the synchronization system, in accordance with another example of the present subject matter.

FIG. 3 illustrates a block diagram of the synchronization system 202, in accordance with another example of the present subject matter. As discussed above, the synchronization system 202 may be implemented in a computing environment, such as the computing environments 100 and 200.

In one example, the synchronization system 202 may assist in monitoring synchronization of data among a plurality of data stores in the computing environment. As discussed above, the computing environment may include a plurality of data stores, such as the first data store 106-1, the second data store 106-2, . . . , and the N$^{th}$ data store 106-N. The synchronization system 202 may be communicably coupled with the data stores and may monitor synchronization between therebetween. In another example, the synchronization system 202 may be communicably coupled with one of the data stores 106-1, 106-2, . . . , and 106-N. For example, the synchronization system 202 may be communicably coupled with the second data store 106-2 for monitoring synchronization of the second data store 106-2 with other data stores, such as the data stores 106-1 and 106-N. For discussion purposes, monitoring of synchronization has been discussed with respect to the first data store 106-1 and the second data store 106-2. However, the monitoring may also be performed on more or all of the data stores associated with the computing environment.

In one example, the synchronization system 202 may include a processor, such as the processor 204, a memory 302, a communication interface 304, and an indication generation unit 306. The processor 204, the memory 302, the communication interface 304, and the indication generator unit 306 may be communicably coupled with each other. In another example, the processor 20 may include the memory 302, the communication interface 304, and the indication generation unit 306.

The functions of various elements shown in the figures, including any functional blocks labelled as "processor 204", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA). Other hardware, standard and/or custom, may also be coupled to the processor 204.

Further, the memory 302 may be a computer-readable medium, examples of which include volatile memory (e.g., RAM), and/or non-volatile memory (e.g., Erasable Programmable read-only memory, i.e., EPROM, flash memory, etc.). The memory 302 may be an external memory, or internal memory, such as a flash drive, a compact disk drive, an external hard disk drive, or the like. The memory 302 may further include data that either may be utilized or generated during the operation of the synchronization system 202.

The communication interface 304 may allow the connection or coupling of the synchronization system 202 with one or more other devices, through a wired (e.g., Local Area Network, i.e., LAN) connection or through a wireless connection (e.g., Bluetooth®, WiFi). The communication interface 304 may also enable intercommunication between different logical as well as hardware components of the synchronization system 202. The communication interface 304 may also enable intercommunication between the data storage unit 106, the first and second communication networks, the data sources 102, and data hub(s) 112.

Further, the indication generation unit 306 may be configured, in one example, to cause rendering of one or more indicators to indicate a state of synchronization between the data stores, as will be discussed. The indication generation unit 306 may be communicatively coupled with the processor 204. In another example, the processor 204 may include the indication generation unit 306.

In one example implementation, the processor 204 may receive a first statistic from one of the data stores 106-1, 106-2., and 106-N. The first statistic may indicate, in one example, a number of records 104 in the first record set received at the first data store 106-1 over a first period of time. In one example, the first record set may include the records 104 received from the data sources 102 over the first period of time. The records 104 may indicate, for example, the parameters being monitored by the data sources 102. Examples of the parameters may include, but are not limited to, temperature, pressure, humidity, network traffic, bandwidth consumption, and flow rate.

As discussed above, each of the data stores may maintain the database or log indicating details associated with the records 104 being received and stored therein. The log may include the total count indicating the first statistic, i.e., number of records 104, in the first record set, that may have been received by the first data store 106-1 over the first period of time.

Further, the processor 204 may receive the first statistic, in one example, in response to receipt of the first record set at the first data store. For example, reception of the records 104 in the first record set may trigger a workflow causing the processor 204 to receive the first statistic from the first data store 106-1. In another example, upon determining that the first data store 106-1 has received records 104 in the first record set, the processor 204 may initiate a workflow to receive the first statistic from the first data store 106-1.

The processor 204 may further obtain a second statistic from one of the data stores. For instance, the second statistic may be obtained from the second data store 106-2. The second statistic may indicate, in one example, a number of records 104 in the first record set received at the second data store 106-2 over the first period of time. As discussed above, each of the data stores may maintain the database or log indicating details associated with the records 104 being received and stored therein. The log may include the total count indicating the first statistic, i.e., number of records 104, in the first record set, that may have been received by the second data store 106-2 over the first period of time.

The second statistic may be obtained, in one example, by the processor 204 in response to receiving the first statistic. As the processor 204 may be communicably coupled with the second data store 106-2, the processor 204 may obtain the second statistic. In one example, the processor 204 may be configured to implement one or more workflows, upon receiving the first statistic, for communicating with the second data store 106-2 and obtaining the second statistic. In another example, the processor 204 may be implemented at the second data store 106-2 and may thus be able to obtain the second statistic, upon receiving the first statistic.

In another example, the processor 204 may be configured to receive or obtain the first statistic and the second statistic in a predefined manner. For example, the processor 204 may be configured to receive the first statistic and the second statistic periodically from the first data store 106-1 and the second data store 106-2. In one example, the predefined manner may be defined by the user. The user may interact with the user interface (not shown), either communicably coupled with the synchronization system 202 or hosted by the synchronization system 202.

Based on the first statistic and the second statistic, the processor 204 may ascertain a first intermediate state of synchronization between the first data store 106-1 and the second data store 106-2. In one example, the processor 204 may compare the first statistic and the second statistic to ascertain whether the first data store 106-1 and the second data store 106-2 comply with the first intermediate state of synchronization. In one example, the processor 204 may compare the first and the second statistics to determine whether the number of records 104, in the first record set, received at the first and the second data stores are in accordance with each other.

If the processor 204 determines that the number of records 104 in the first record set received at the second data store 106-2 is in accordance with the first data store 106-1, the processor 204 may ascertain that the first data store 106-1 and the second data store 106-2 are in the first intermediate state of synchronization. However, if the processor 204 determines that the number of records 104 in the first record set received at the first data store 106-1 and the second data store 106-2 are inconsistent with each other, the processor 204 may ascertain that the first data store 106-1 and the second data store 106-2 are not in the first intermediate state of synchronization. Thus, the first intermediate state of synchronization indicates whether the first statistic and the second statistic are in accordance with each other, and thereby the first and the second data stores comply with the first intermediate state of synchronization.

In one example, accordance with the first statistic and the second statistic may indicate that each of the first and the second data stores received equal number of records 104 in the first record set over the first period of time. In another example, accordance with the first and the second statistics may indicate that each of the first and the second data stores received a number of records 104, in the first record set over the first period of time, within a predefined allowable range defined. The user may define, for example, the allowable range using the user interface. In one example, the allowable range may indicate a difference in number of records 104 that may be acceptable for considering that both the data stores comply with the first intermediate state of synchronization.

In one example, upon ascertaining the first intermediate state of synchronization, the processor 204 may trigger rendering of a first indicator to indicate the first intermediate state of synchronization. For example, the processor 204 may execute or implement one or more workflows that may trigger rendering of the first indicator. In one example, the first indicator may be rendered on the user interface. If the processor 204 ascertains that the first and the second data stores comply with, or are in, the first intermediate state of synchronization, the processor 204 may trigger rendering of the first indicator to indicate a positive response/acknowledgment. Examples of the positive acknowledgment may include, but are not limited to, a textual indication, a colour coded indication, an audio message, a prompt on the user interface, or a combination thereof to indicate that the first and the second data stores are in the first intermediate state of synchronization. In one example, upon ascertaining that the first data store 106-1 and the second data store 106-2 are in the first intermediate state of synchronization, the processor 204 may trigger rendering of a textual indication indicating "First intermediate state of Synchronization Complied". In another example, the processor 204 may trigger rendering of a "green" coloured indication on the user interface to indicate compliance with the first intermediate state of synchronization.

However, If the processor 204 ascertains that the first and the second data stores do not comply with, or are not in, the first intermediate state of synchronization, the processor 204 may trigger rendering of the first indicator to indicate a negative response/acknowledgment. Examples of the negative response/acknowledgment may include, but are not limited to, a textual indication, a colour coded indication, an audio message, a prompt on the user interface, or a combination thereof to indicate that the first and the second data stores are not in the first intermediate state of synchronization. In one example, upon ascertaining that the first data store 106-1 and the second data store 106-2 are not in the first intermediate state of synchronization, the processor 204 may trigger rendering of a textual indication indicating "First intermediate state of Synchronization Not Complied". In another example, the processor 204 may trigger rendering of a "red" coloured indication of the user interface to indicate the first intermediate state of synchronization.

Further, based on ascertaining the first intermediate state of synchronization, the processor 204 may determine a first metric and a second metric. For example, if the processor 204 determines that the first statistic and the second statistic are in accordance with each other, the processor 204 may ascertain to determine the first metric and the second metric. The processor 204 may initiate or implement one or more workflows to communicate with the first data store 106-1 and the second data store 106-2 to determine the first metric and the second metric, respectively.

In one example, the first metric may indicate a number of records 118 in the second record set received over the second period of time at the first data store 106-1. The second record set may include one or more of the records 118 derived based on records 104 in the first record set received by, say, the first data store 106-1. As previously discussed, the records 118 in the second record set may be received, in one example, by the data stores from the data computation unit(s) 116. The database or logs maintained by each of the data stores may store details including the total count indicating a number of records 118 received by that data store over the second period of time. The processor 204 may determine the first and the second metrics form the data-based or logs maintained by each of the data stores. However, it may also be possible to use or implement other techniques for determining the first metric and the second metric.

Based on the first metric and the second metric, the processor 204 may ascertain a second intermediate state of synchronization. For example, the processor 204 may compare the first metric and the second metric. That is, the processor 204 may compare the number of records 118, in the second record set, received at the first and the second data stores over the second period of time. The processor 204 may compare the first metric and the second metric to determine whether both the data stores received the same number of records 118 in the second record set over the second period of time. For example, a comparison between the first and the second metrics may indicate whether both the data stores received an equal number of KPIs over the second period of time. If the processor 204 determines that the number of records 118 in the second record set received at the second data store 106-2 is in accordance with the first data store 106-1, the processor 204 may ascertain that the first data store 106-1 and the second data store 106-2 are in the second intermediate state of synchronization. For example, if the processor 204 determines that the first and the second data stores received same number of records 118 in the second record set, the processor 204 may ascertain that the first and the second data stores comply with, or are in, the second intermediate state of synchronization. However, if the processor 204 determines that the number of records 118 in the second record set received at the first and the second data stores are inconsistent or unequal, the processor 204 may ascertain that both the data stores may not comply with, or be in, the second intermediate state of synchronization.

In one example, the user may define a condition, based on the first and the second metric, for ascertaining whether the first data store 106-1 and the second data store 106-2 are in the second intermediate state of synchronization. For example, the user may define a number of records 118, in the second record set, that should be received by the first and the second data stores over the second period of time to ascertain that the first and the second data stores are in the second intermediate state of synchronization.

In one example, the user may define the metrics-based conditions, the second period of time, and the first period of time using the user interface. The user interface may be, in one example, a graphical user interface (GUI) that may act as an interface between the user and the synchronization system 202, or the processor 204. The user interface may be implemented and/or hosted by the synchronization system 202, or the processor 204. In another example, the user interface may be implemented and/or hosted by an external service provider to receive one or more instructions being provided by the user. The external service provider may then share the one or more instructions with the synchronization system 202, or the processor 204.

In one example, upon ascertaining the second intermediate state of synchronization, the processor 204 may trigger rendering of a second indicator to indicate the second intermediate state of synchronization. For example, the processor 204 may execute or implement one or more workflows that may trigger rendering of the second indicator. In one example, the second indicator may be rendered on the user interface. If the processor 204 ascertains that the first and the second data stores comply with, or are in, the second intermediate state of synchronization, the processor 204 may trigger rendering of the second indicator to indicate a positive feedback. Examples of the positive feedback may include, but are not limited to, a textual indication, a colour coded indication, an audio message, a prompt on the user interface, or a combination thereof to indicate that the first and the second data stores are in the second intermediate state of synchronization. In one example, upon ascertaining that the first data store 106-1 and the second data store 106-2 are in the second intermediate state of synchronization, the processor 204 may trigger rendering of a textual indication indicating "Second intermediate state of Synchronization Complied". In another example, the processor 204 may trigger rendering of an image on the user interface to indicate compliance with the second intermediate state of synchronization.

However, If the processor 204 ascertains that the first and the second data stores do not comply with, or are not in, the second intermediate state of synchronization, the processor 204 may trigger rendering of the second indicator to indicate a negative feedback. Examples of the negative feedback may include, but are not limited to, a textual indication, a colour coded indication, an audio message, a prompt on the user interface, or a combination thereof to indicate that the first and the second data stores are not in the second intermediate state of synchronization. In one example, upon ascertaining that the first data store 106-1 and the second data store 106-2 are not in the second intermediate state of synchronization, the processor 204 may trigger rendering of a textual indication indicating "Second intermediate state of Synchronization Not Complied". In another example, the processor 204 may trigger the rendering of another image on the user interface to indicate non-compliance with the second intermediate state of synchronization.

Further, upon ascertaining that both the data stores are in the second intermediate state of synchronization, the processor 204 may obtain identification information associated with each of the records 118 in the second record set received at the first data store 106-1 and at the second data store 106-2. As discussed above, each of the data stores may maintain the database or log, in one example, indicating identification information associated with each of the records 104 and records 118. The identification information may include, for example, a unique identification number associated with each of the records 104 and records 118. For instance, each of the records 118, such as the KPIs, may have a unique identification number associated therewith.

Thus, each of the records 118 in the second record set may have a unique identification information, such as a unique identification number associated therewith. The processor 204 may compare the identification information for each of the records 118 in the second record set received at each of the first data store 106-1 and the second data store 106-2, respectively, to ascertain whether the same records 118 have been received at the first and the second data stores.

By comparing the identification information, the processor 204 may ascertain whether at least one unique record is present among one of the first and the second data stores, while the at least one unique record may be missing on other of the first data store 106-1 and the second data store 106-2. That is, by comparing the identification information associated with each of the records 118 received by the first and the second data stores, the processor 204 may ascertain whether only one of the first and the second data stores received the at least one record 118 and the other of the first and the second data store did not receive the same record 118. The at least one record 118 may thus be unique as it may have only been received at one of the first and the second data stores.

Accordingly, the processor 204 may determine a final state of synchronization between the first data store 106-1 and the second data store 106-2. For instance, on ascertaining that the unique record is present on one of the first data store 106-1 and the second data store 106-2, while the unique record is missing on the other of the first data store 106-1 and the second data store 106-2, the processor 204 may ascertain that the first and the second data stores may not have received same records 118 and are thus unsynchronized. The final state of synchronization may thus indicate that the first data store 106-1 and the second data store 106-2 are not synchronized with each other and that both the data stores may probably have different records 104 and 118. However, on ascertaining that no unique record is present on either of the first and the second data stores, the processor 204 may ascertain that the first and the second data stores may have received the same records 118 and are thus synchronized with each other. The final state of synchronization may thus indicate that the first data store 106-1 and the second data store 106-2 are synchronized with each other and that both the data stores may have same records 104 and 118.

Further, the processor 204 may trigger rendering of at least one indicator to indicate the final state of synchronization. The at least one indicator may thus indicate whether the first and the second data stores are synchronized, and whether they have same records 104 and 118. The at least one indicator may include at least one of a sync indicator and an async indicator. Examples of the at least one indicator may include, but are not limited to, a textual indicator, a coloured indicator, an audio indication, a visual prompt on the user interface, or a combination thereof to indicate whether the first and the second data stores are synchronized, i.e., the final state of synchronization. In one example, the processor 204 may trigger rendering of the at least one indicator on the user interface (not shown).

In one example, the processor 204 may trigger rendering of the sync state indicator to indicate that the first data store 106-1 and the second data store 106-2 may be synchronized with each other. In one example, upon ascertaining that the first data store 106-1 and the second data store 106-2 comply with the final state of synchronization, the processor 204 may trigger rendering of a textual indication indicating "Final state of Synchronization Complied". Whereas, the processor 204 may trigger rendering of the async state indicator to indicate that the first data store 106-1 and the second data store 106-2 may be unsynchronized with each other. In one example, upon ascertaining that the first data store 106-1 and the second data store 106-2 do not comply with the final state of synchronization, the processor 204 may trigger rendering of a textual indication indicating "Final state of Synchronization not Complied".

Further, in one example, the processor 204 may determine whether recalculation or rederivation of one or more records 118 in the second record set is required. For example, the processor 204 may determine whether one or more records 104 in the first record set were received after one or more records 118 in the second record set have been derived. That is, the processor 204 may determine whether a new record 104 has been received that may not have been considered for deriving one or more records 118 in the second record set, as the records 118 have been derived earlier than reception of the new record 104. As discussed above, the details, for example in form of log or table, associated with each of the records 104 and 118. The details associated with each of the records 104 and the records 118 may include corresponding record timestamps. The record timestamps may indicate, in one example, a time of reception of the records 104 and records 118 at the corresponding data stores. For example, each of the records 104 in the first record set may have a first record timestamp associated therewith, the first record timestamp indicating a time of reception of the corresponding record 104 at the first data store 106-1. Further, each of the records 118 in the second record set may have a second record timestamp associated therewith, the second record timestamp indicating a time of derivation of the corresponding records 118 at the first data store 106-1.

The processor 204 may access the first and the second record timestamps. Based on the first record timestamp associated with each of the records 104 in the first record set and the second record timestamp associated with each of the records 118 in the second record set, the processor 204 may determine whether one or more records, from amongst the records 104 in the first record set, were received at the first data store 106-1 after derivation of at least one record from amongst the records 118 in the second record set. For example, if a record 118, say a KPI, was computed at 01:10 AM based on the records 104 received for the first period of time of 11-1 AM, the processor 204 (based on the timestamps of records 104 and 118) may ascertain that recalculation of the record 118 may not be required as the record 118 was computed based on the records 104 that were received before computation of the record 118. However, if one or more records 104 are received after the first period of time, and/or after computation of the record 118, the processor 204 may ascertain that recalculation of the record 118 may be required. For example, if the record 104 is delayed and is received at, say, 01:15 AM, and the record 118 was calculated at 01:10 AM, the processor 204 may ascertain that the recalculation of the record 118 (based on updated or new record 104) may be desired.

The processor 204 may accordingly cause rendering of a rederivation indicator to indicate that rederivation of the record 118 may be recommended. In one example, the rederivation indicator may be a visual indication that may be caused to render on the user interface. Other examples of the rederivation indicator may include, but are not limited to, textual indicators, audio indicators, images, or a combination thereof. In one example, the processor 204 may cause rendering of the rederivation indicator on the user interface to indicate "new record received, rederivation recommended".

Further, in one example, the processor 204 may, upon determining requirement of rederivation, communicate with the data computation unit(s) 116 to instruct the data computation unit(s) 116 for deriving new or updated records 118 based on the new or updated record 104. In response, the data computation unit(s) 116 may derive the updated records 118. The updated record 118 may then be communicated to the data stores.

In one example, the processor 204 may be capable of causing rendering of the first indicator, the second indicator, the sync indicator, the async indicator, and the rederivation indicator. In another example, the processor 204 may communicate with the indication generation unit 306 to cause rendering of the first indicator, the second indicator, the sync indicator, the async indicator, and the rederivation indicator. The indication generation unit 306 may be implemented by one or more hardware modules, one or more software modules, or a combination thereof. The indication generation unit 306 may be configured to execute one or more workflows for causing rendering of the above-mentioned indicators. The indication generation unit 306 may be communicably coupled with the user interface for causing rendering of the above-mentioned indicators.

Figure 4:
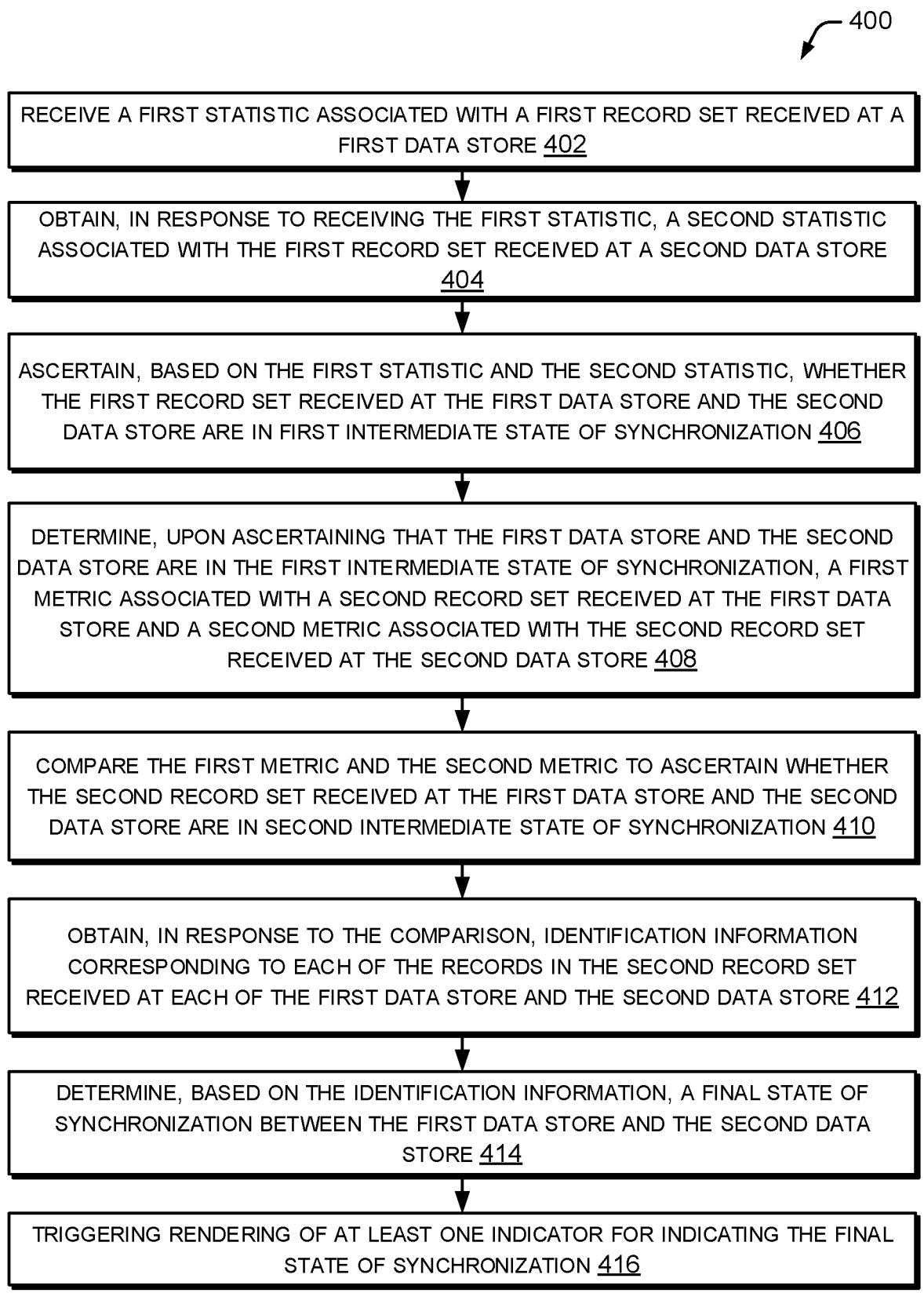
FIG. 4 illustrates a method for monitoring synchronization of data among the plurality of data stores, according to an example implementation of the present subject matter.
Figure 5:
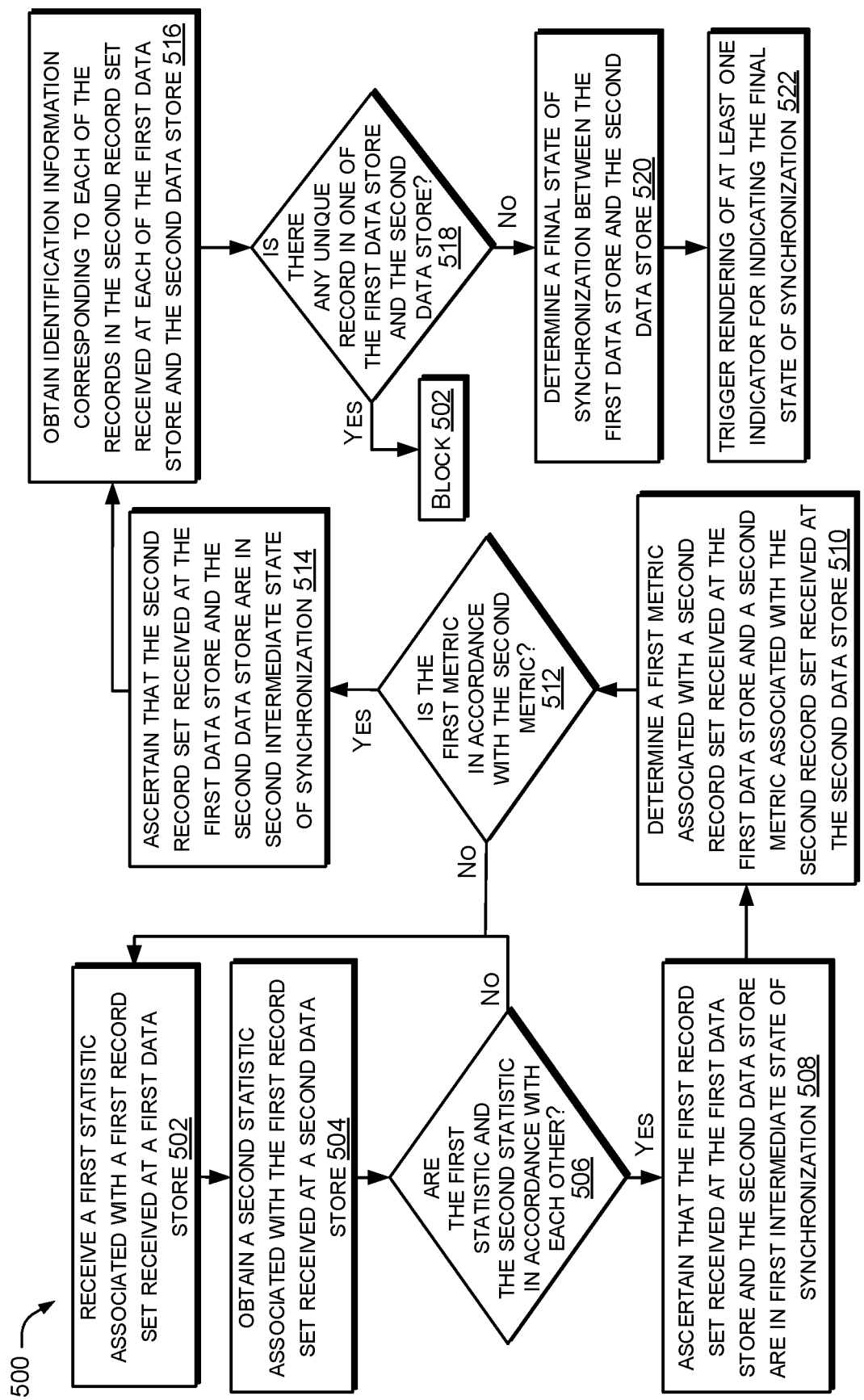
FIG. 5 illustrates the method for monitoring synchronization of data among the plurality of data stores, according to another example implementation of the present subject matter.

FIGS. 4 and 5 illustrate exemplary methods 400 and 500, respectively, for monitoring synchronization of data among a plurality data stores. The order in which the methods are described is not intended to be construed as a limitation, and any number of the described method blocks may be combined in any order to implement the methods, or an alternative method. Furthermore, methods 400 and 500 may be implemented by processing resource or computing device(s) through any suitable hardware, non-transitory machine-readable instructions, or combination thereof.

It may also be understood that methods 400 and 500 may be performed by programmed computing devices, such as the processor 204, as depicted in FIGS. 1A-3. Furthermore, the methods 400 and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. While the methods 400 and 500 are described below with reference to the processor 204 and the synchronization system 202 as described above, other suitable systems for the execution of these methods may also be utilized. Additionally, implementation of these methods is not limited to such examples.

FIG. 4 illustrates the method 400 for monitoring synchronization of data among the plurality of data stores, according to an example implementation of the present subject matter. In one example, the data may include one or more records, such as the records 104 received from the data sources 102 and records 118 received from the data computation unit(s) 116.

At block 402, a first statistic associated with a first record set may be received at a first data store. In one example, the first record set may include one or more of the records, such as the records 104, received from data sources, such as the data sources 102. The first statistic may indicate, in one example, a number of records in the first record set received at the first data store, such as the first data store 106-1.

At block 404, a second statistic associated with the first record set received at a second data store may be obtained. In one example, the second statistic may be obtained from the second data store, such as the second data store 106-2. The second statistic may be obtained, in one example, in response to receiving the first statistic. The second statistic may indicate a number of records, such as the records 104, in the first record set received by the second data store.

At block 406, it may be ascertained, based on the first statistic and the second statistic, whether the first record set received at the first data store and the second data store are in first intermediate state of synchronization. In one example, the first statistic and the second statistic may be compared to ascertain whether the first data store and the second data store comply with the first intermediate state of synchronization. For example, the number of records, in the first record set, received at each of the first and the second data stores may be compared to determine whether the first and the second statistics are in accordance with each other. If it is determined that the number of records in the first record set received at the second data store is in accordance with the first data store, or vice versa, it may be ascertained that the first data store and the second data store are in the first intermediate state of synchronization. However, if the number of records in the first record set received at the first and the second data stores are inconsistent with each other, it may be ascertained that both the data stores are not in the first intermediate state of synchronization.

At block 408, a first metric associated with a second record set received at the first data store and a second metric associated with the second record set received at the second data store may be determined upon ascertaining that the first data store and the second data store are in the first intermediate state of synchronization. In one example, upon ascertaining the first intermediate state of synchronization, the first and the second metrics may be determined. The first metric may indicate a number of records, such as the records 118, in a second record set received at the first data store. The second record set may include one or more of the records that may be derived based on records in the first record set received by the first data store. For example, the second record set may include records, such as one or more KPIs, that may be derived based on the records in the first record set received by the first data store. Further, the second metric may indicate a number of records, such as the records 118, in the second record set received at the second data store.

At block 410, the first metric and the second metric may be compared to ascertain whether the second record set received at the first data store and the second data store are in second intermediate state of synchronization. In one example, the number of records, in the second record set, received at each of the first and the second data stores may be compared. The comparison may be performed to determine whether both the data stores received the equal number of records in the second record set. For example, a comparison between the first and the second metrics may indicate whether both the data stores received an equal number of records. If it is determined that the number of records in the second record set received at one of the data stores, say, the second data store is in accordance with the first data store, it may be ascertained that the first data store and the second data store are in the second intermediate state of synchronization. However, if it is determined that the number of records in the second record set received at each of the first and the second data stores are unequal, it may be ascertained that both the data stores may not be in the second intermediate state of synchronization.

At block 412, identification information corresponding to each of the records in the second record set received at each of the first data store and the second data store may be obtained, in response to the comparison. In one example, upon ascertaining that both the data stores are in the second intermediate state of synchronization, based on the comparison between the first and the second metrics, the identification information associated with each of the records in the second record set received at the first data store and at the second data store may be obtained. Each of the records in the second record set may have a unique identification information.

At block 414, a final state of synchronization may be determined based on the identification information. In one example, the identification information for the records in the second record set received at the first data store and the second data store may be compared to ascertain whether the same records have been received at the first and the second data stores. By comparing the identification information, it may be identified whether a unique record is present among one of the first and the second data stores, while the unique record may be missing on other of the first data store and the second data store. Accordingly, the final state of synchronization between the first data store and the second data store may be determined. For instance, on ascertaining that the unique record is present on one of the first data store and the second data store, while the unique record is missing on the other of the first data store and the second data store, it may be ascertained that the first and the second data stores may not have received same records and are thus unsynchronized. However, on ascertaining that no unique record is present on either of the first and the second data stores, it may be ascertained that the first and the second data stores may have received the same records and are thus synchronized with each other.

At block 416, rendering of at least one indicator may be triggered for indicating the final state of synchronization. In one example, rendering of a sync state indicator may be triggered to indicate that the first data store and the second data store may be synchronized with each other. Also, rendering of an async state indicator may be triggered to indicate that the first data store and the second data store may be unsynchronized with each other.

FIG. 5 illustrates the method 500 for monitoring synchronization of data among the plurality of data stores, according to another example implementation of the present subject matter.

At block 502, a first statistic associated with a first record set may be received at a first data store. In one example, the first statistic may indicate a number of records in the first record set received at the first data store, such as the first data store 106-1.

At block 504, a second statistic associated with the first record set received at a second data store may be obtained. In one example, the second statistic may indicate a number of records in the first record set received by the second data store.

At block 506, it may be determined whether the first statistic and the second statistic are in accordance with each other. In one example, the first statistic and the second statistic may be compared with each other. If the first statistic and the second statistic are determined to be in accordance with each other, the method may follow the Yes path to block 510.

At block 508, it may be ascertained that the first record set received at the first data store and the second data store are in first intermediate state of synchronization. In one example, the first data store and the second data store are determined to be in, or comply with, the first intermediate state of synchronization if the first and the second data store received same number of records in the first record set. The determination may be made based on comparison between the first and the second statistic. Thus, compliance with the first intermediate state of synchronization indicates that the first statistic and the second statistic are in accordance with each other, and thereby the first and the second data stores comply with the first intermediate state of synchronization.

At block 510, a first metric associated with a second record set received at the first data store and a second metric associated with the second record set received at the second data store may be determined. In one example, the first metric may indicate a number of records in the second record set received at the first data store and the second metric may indicate a number of records in the second record set received at the second data store.

At block 512, it may be determined whether the first metric is in accordance with the second metric. In one example, the determination may be made by analyzing the first and the second metrics. For instance, upon analysis, if the first metric and the second metric are determined to be equal, the method may follow the Yes path to block 514.

At block 514, it may be ascertained that the second record set received at the first data store and the second data store are in second intermediate state of synchronization. In one example, upon determination that the first and the second metric are in accordance with each other, i.e., the number of records in the second record set received at the second data store and the first data store appear to be equal, it may be ascertained that the first data store and the second data store are in the second intermediate state of synchronization.

At block 516, identification information corresponding to each of the records in the second record set received at each of the first and the second data stores may be obtained. In one example, each of the records in the second record set, received at the first and the second data stores, may have an identification information associated therewith. The identification information for each of the records may thus be obtained.

At block 518, it may be determined whether there is any unique record in one of the first data store and the second data store. In one example, the identification information for each of the records in the second record set received at each of the first data store and the second data store, respectively, may be compared to ascertain reception of a unique record at one of the first data store and the second data store. The unique record may be from amongst the records in the second record set received by one of the first data store and the second data store and being missing at other of the first data store and the second data store. If it is determined that there is at least one unique record in one of the first and the second data stores, the method may follow the No path to block 520.

At block 520, a final state of synchronization between the first and the second data stores. In one example, on ascertaining that no unique record is present on either of the first and the second data stores, it may be ascertained that the first and the second data stores may have received the same records in the second record set and are thus synchronized with each other. The final state of synchronization may thus indicate that the first data store and the second data store are synchronized with each other.

At block 522, rendering of at least one indicator indicating the final state of synchronization may be triggered. In one example, the at least one indicator may indicate whether the first and the second data stores are synchronized, and whether they have same records in the first and the second record sets. Examples of the at least one indicator may include, but are not limited to, a textual indicator, a coloured indicator, an audio indication, a visual prompt on the user interface, or a combination thereof to indicate whether the first and the second data stores are synchronized, i.e., the final state of synchronization.

However, in one example, if at block 518, it is determined that there is at least one unique record in one of the first data store and the second data store, the method may follow the Yes path to block 502.

In another example, if at block 518, it is determined that there is at least one unique record in second record set in one of the first data store and the second data store, the method may proceed (not illustrated) to determine that recalculation of one or more records 118 in the second record set is required. In one example, each record in the first record set has a corresponding first record timestamp indicating a time of reception of the corresponding record at the first data store, and each record in the second record set has a corresponding second record timestamp indicating a time of reception of the corresponding record at the first data store. Based on the first record timestamp associated with corresponding records in the first record set and the second record timestamp associated with corresponding records in the second record set, it may be determined whether a record, from amongst the records in the first record set, was received at the first data store subsequent to derivation of a record from amongst the records in the second record set. Upon determining that the record was received subsequent to derivation of the record in the second record set, derivation of an updated record for the second record set may be caused. The updated record may be derived based on the record received subsequent to derivation of the record in the second record set. Further, the updated record may then be shared with the first and the second data stores for being stored therein.

However, if at block 512, it is determined that the first metric is not in accordance with the second metric, no further steps (for example, as discussed through blocks 514 to 522) may be performed or implemented and the method may proceed to block 502.

Further, if at block 506, it is determined that the first and the second statistics are not in accordance with each other, no further steps (for example, as discussed through blocks 508 to 522) may be performed or implemented and the method may proceed to block 502.

Figure 6:
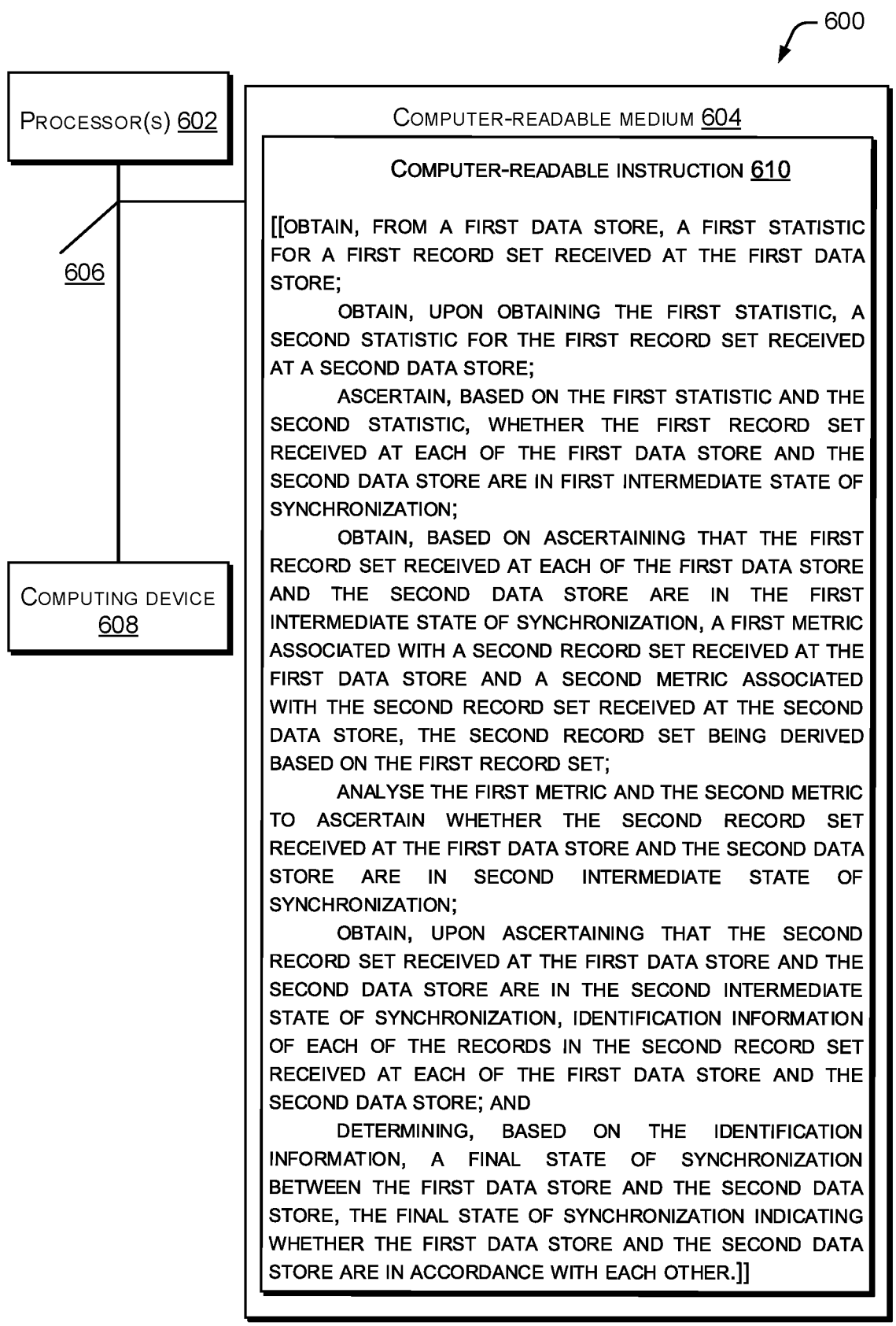
FIG. 6 illustrates a non-transitory computer-readable medium for monitoring synchronization of a plurality of data stores in a computing environment, in accordance with an example of the present subject matter.

FIG. 6 illustrates a non-transitory computer-readable medium for monitoring synchronization of a plurality of data stores in a computing environment, in accordance with an example of the present subject matter.

In an example, the computing environment 600 includes processor 602 communicatively coupled to a non-transitory computer readable medium 604 through communication link 606. In an example, the processor 602 may have one or more processing resources for fetching and executing computer-readable instructions from the non-transitory computer readable medium 604. The processor 602 and the non-transitory computer readable medium 604 may be implemented, for example, in the synchronization system 202.

The non-transitory computer readable medium 604 may be, for example, an internal memory device or an external memory. In an example implementation, the communication link 606 may be a network communication link, or other communication links, such as a PCI (Peripheral component interconnect) Express, USB-C (Universal Serial Bus Type-C) interfaces, I2C (Inter-Integrated Circuit) interfaces, etc. In an example implementation, the non-transitory computer readable medium 604 includes a set of computer readable instructions 610 which may be accessed by the processor 602 through the communication link 606 and subsequently executed for reconfiguring the data pipeline. The processor(s) 602 and the non-transitory computer readable medium 604 may also be communicatively coupled to a computing device 608 over the network.

Referring to FIG. 6, in an example, the non-transitory computer readable medium 604 includes computer readable instructions 610 that cause the processor 602 to obtain a first statistic from a first data store, such as the first data store 106-1, for a first record set received at the first data store. The first statistic may be received, in one example, in response to receipt of a first record set at the first data store 106-1. The first record set may include one or more of the records, such as the records 104, received from one or more data sources, such as the data sources 102. Further, the first statistic may indicate, in one example, a number of records 104 in the first record set received at the first data store 106-1 over a first period of time.

The instructions 610 may further cause the processor 602 to obtain a second statistic upon obtaining the first statistic. The second statistic may be obtained from another data store, such as the second data store 106-2. The second statistic may indicate a number of records 104 received in the first record set by the second data store 106-2 over the first predefined period of time.

The instructions 610 may further cause the processor 602 to ascertain, based on the first statistic and the second statistic, whether the first record set received at each of the first data store 106-1 and the second data store 106-2 are in first intermediate state of synchronization. In one example, the first statistic and the second statistic may be compared to ascertain whether the first data store 106-1 and the second data store 106-2 comply with the first intermediate state of synchronization. In one example, comparison of the first and the second statistics may indicate whether the number of records 104, in the first record set, received at the first and the second data stores are in accordance with each other. If it is determined that the number of records 104 in the first record set received at the second data store is in accordance with the first data store 106-1, it may be ascertained that the first data store 106-1 and the second data store 106-2 are in the first intermediate state of synchronization. However, if it is determined that the number of records 104 in the first record set received at the first and the second data stores are inconsistent with each other, it may be ascertained that the data stores are not in the first intermediate state of synchronization.

The instructions 610 may further cause the processor 602 to obtain, based on ascertaining that the first record set received at each of the first data store 106-1 and the second data store 106-2 are in the first intermediate state of synchronization, a first metric associated with a second record set received at the first data store 106-1 and a second metric associated with the second record set received at the second data store 106-2. In one example, the second record set may be derived based on the first record set.

Further, in one example, the first metric may indicate a number of records, such as the records 118, in the second record set received over a second period of time at the first data store 106-1. Further, the second metric may indicate a number of records 118 in the second record set received over the second period of time at the second data store 106-2.

The instructions 610 may further cause the processor 602 to analyse the first metric and the second metric to ascertain whether the second record set received at the first data store 106-1 and the second data store 106-2 are in second intermediate state of synchronization. In one example, the analysis may include comparing the first and the second metrics. The comparison may be performed to determine whether both the data stores received the same number of records 118 in the second record set. If it is determined that the number of records 118 in the second record set received at the second data store 106-2 is in accordance with the first data store 106-1, it may be ascertained that the first data store 106-1 and the second data store 106-2 are in the second intermediate state of synchronization. However, if it is determined that the number of records 118 in the second record set received at the first and the second data stores are inconsistent with each other, it may be ascertained that both the data stores may not be in the second intermediate state of synchronization.

The instructions 610 may further cause the processor 602 to obtain, upon ascertaining that both the second record set received at the first and the second data stores are in the second intermediate state of synchronization, identification information of each of the records 118 in the second record set received at the first data store 106-1 and at the second data store 106-2. As previously discussed, each of the records 118 in the second record set may have a unique identification information. The identification information for the records 118 in the second record set received at the first data store 106-1 and the second data store 106-2 may be compared to ascertain whether the same records have been received at the first and the second data stores. By comparing the identification information, reception of a unique record at one of the first data store and the second data store may be ascertained, where the unique record may be from amongst the records in the second record set received by one of the first data store 106-1 and the second data store 106-2 and missing at other of the first data store 106-1 and the second data store 106-2.

The instructions 610 may further cause the processor 602 to determine, based on the identification information, a final state of synchronization between the first data store 106-1 and the second data store 106-2. For instance, on ascertaining that the unique record is received at one of the first data store 106-1 and the second data store 106-2, while the unique record is missing on the other of the first data store 106-1 and the second data store 106-2, it may be determined that the first and the second data stores may not have received same records 118 and are thus unsynchronized. However, on ascertaining that no unique record has been received at either of the first and the second data stores, it may be ascertained that the first and the second data stores may have received the same records 118 and are thus synchronized with each other. Thus, based on the identification information, the final state of synchronization, i.e., synchronized or unsynchronized, of the data stores may be determined.

Further, in one example, instructions 610 may further cause the processor 602 to recommend recalculation or rederivation of one or more records 118 in the second record set. For example, it may be determined whether one or more records 104 in the first record set were received after one or more records 118 in the second record set have been derived. As previously discussed, each of the records 104 and 118 may have record timestamps associated therewith. For example, each record in the first record set has a corresponding first record timestamp indicating a time of reception of the corresponding record at the first data store 106-1, and each record in the second record set has a corresponding second record timestamp indicating a time of reception of the corresponding record at the first data store 106-1. Based on the record timestamps of each of the records 104 and 118, it may be determined whether a new record 104 has been received that may not have been used for deriving one or more records 118 in the second record set, as the records 118 have been derived before reception of the new record 104. In such instances, it may be determined that an updated record 118 for the second record set is required to be derived based on the newly received record 104 in the first record set. The instructions 610 may thus cause the processor 602 to determine and accordingly generate recommendations.

Although examples of the present subject matter have been described in language specific to methods and/or structural features, it is to be understood that the present subject matter is not limited to the specific methods or features described. Rather, the methods and specific features are disclosed and explained as examples of the present subject matter.

What is claimed is:
1. A synchronization system, comprising:
   at least one processor; and
   a memory communicatively coupled to the at least one processor, wherein the memory comprises one or more instructions which when executed by the at least one processor, cause the at least one processor to:
      receive a first statistic for a first record set received over a first period of time at a first data store;
      obtain a second statistic for the first record set received over the first period of time at a second data store;
      ascertain, based on the first statistic and the second statistic, a first intermediate state of synchronization between the first data store and the second data store;
      determine, based on the first intermediate state of synchronization, a first metric associated with a second record set received over a second period of time at the first data store and a second metric associated with the second record set received over the second period of time at the second data store, the second record set being derived based on the first record set;
      ascertain, based on the first metric and the second metric, a second intermediate state of synchronization between the first data store and the second data;
      obtain, based on the second intermediate state of synchronization, identification information of each of the records in the second record sets received at each of the first data store and the second data store, respectively;
      determine, based on the identification information, a final state of synchronization between the first data store and the second data store; and
      trigger rendering of at least one indicator for indicating the final state of synchronization.
2. The synchronization system of claim 1, wherein the first statistic indicates a number of records in the first record set received over the first period of time at the first data store, and wherein the second statistic indicates a number of records in the first record set received over the first period of time at the second data store.

3. The synchronization system of claim 2, wherein the first intermediate state of synchronization indicates whether the first statistic and the second statistic are in accordance with each other.

4. The synchronization system of claim 1, wherein the first metric indicates a number of records in the second record set received over the second period of time at the first data store, and wherein the second metric indicates a number of records in the second record set received over the second period of time at the second data store.

5. The synchronization system of claim 4, wherein the second intermediate state of synchronization indicates whether the first metric and the second metric are in accordance with each other.

6. The synchronization system of claim 1, wherein the at least one indicator comprises:
a sync state indicator to indicate that the first data store and the second data store are synchronized with each other; and
an async state indicator to indicate that the first data store and the second data store are unsynchronized with each other.

7. The synchronization system of claim 1, wherein the at least one processor is further configured to:
trigger rendering of a first indicator to indicate the first intermediate state of synchronization; and
trigger rendering of a second indicator to indicate the second intermediate state of synchronization.

8. The synchronization system of claim 1, wherein each record in the first record set has a first record timestamp associated therewith, the first record timestamp indicating a time of reception of the corresponding records at the first data store.

9. The synchronization system of claim 8, wherein each of the records in the second record set has a second record timestamp associated therewith, the second record timestamp indicating a time of derivation of the corresponding records at the first data store.

10. The synchronization system of claim 9, wherein the at least one processor is further configured to:
determine, based on the first record timestamp associated with each of the records in the first record set and the second record timestamp associated with each of the records in the second record set, whether one or more records, from amongst the records in the first record set, were received at the first data store after derivation of at least one record from amongst the records in the second record set; and
upon determining that the one or more records were received after derivation of the at least one record in the second record set, trigger derivation of an updated record for the second record set, the updated record being derived based on the one or more records received by the first record set after derivation of the at least one record in the second record set.

11. The synchronization system of claim 1, wherein the at least one processor is further configured to receive the first statistic in response to receipt of the first record set at the first data store.

12. The synchronization system of claim 1, wherein the at least one processor is further configured to:
compare the identification information obtained for each of the records in the second record set received by the first data store and the second data store, respectively;
ascertain, based on the comparison, whether at least one unique record is present at one of the first data store and the second data store while the at least one unique record is missing at other of the first data store and the second data store; and
determine, in response to ascertaining whether the at least one unique record is present at one of the first data store and the second data store while the at least one unique record is missing at the other of the first data store and the second data store, the final state of synchronization between the first data store and the second data store.

13. A method comprising:
receiving, by at least one processor of a synchronization system, a first statistic associated with a first record set received at a first data store;
obtaining, by the at least one processor, in response to receiving the first statistic, a second statistic associated with the first record set received at a second data store;
ascertaining, by the at least one processor, based on the first statistic and the second statistic, whether the first record set received at the first data store and the second data store are in first intermediate state of synchronization;
determining, by the at least one processor, upon ascertaining that the first data store and the second data store are in the first intermediate state of synchronization, a first metric associated with a second record set received at the first data store and a second metric associated with the second record set received at the second data store, the second record set being derived based on the first record set;
comparing, by the at least one processor, the first metric and the second metric to ascertain whether the second record set received at the first data store and the second data store are in second intermediate state of synchronization;
obtaining, by the at least one processor, in response to the comparison, identification information corresponding to each of the records in the second record set received at each of the first data store and the second data store;
determining, by the at least one processor, based on the identification information, a final state of synchronization between the first data store and the second data store; and
triggering by the at least one processor, rendering of at least one indicator for indicating the final state of synchronization.

14. The method of claim 13, the method further comprises comparing, by the at least one processor, the identification information corresponding to each of the records in the second record set received at the first data store and the second data store to ascertain reception of a unique record at one of the first data store and the second data store, the unique record being amongst the records in the second record set received by one of the first data store and the second data store and being missing at other of the first data store and the second data store.

15. The method of claim 13, wherein each record in the first record set has a corresponding first record timestamp indicating a time of reception of the corresponding record at the first data store, and wherein record in the second record set has a corresponding second record timestamp indicating a time of reception of the corresponding record at the first data store.

16. The method of claim 15, the method further comprises:
determining, by the at least one processor, based on the first record timestamp associated with corresponding records in the first record set and the second record timestamp associated with corresponding records in the second record set, whether a record, from amongst the records in the first record set, was received at the first data store subsequent to derivation of a record from amongst the records in the second record set; and causing, by the at least one processor, upon determining that the record was received subsequent to derivation of the record in the second record set, derivation of an updated record for the second record set, the updated record being derived based on the record received subsequent to derivation of the record in the second record set.

17. A non-transitory computer readable medium comprising computer-readable instructions that when executed cause a processing resource of a computing device to:

obtain, from a first data store, a first statistic for a first record set received at the first data store;

obtain, upon obtaining the first statistic, a second statistic for the first record set received at a second data store;

ascertain, based on the first statistic and the second statistic, whether the first record set received at each of the first data store and the second data store are in first intermediate state of synchronization;

obtain, based on ascertaining that the first record set received at each of the first data store and the second data store are in the first intermediate state of synchronization, a first metric associated with a second record set received at the first data store and a second metric associated with the second record set received at the second data store, the second record set being derived based on the first record set;

analyse the first metric and the second metric to ascertain whether the second record set received at the first data store and the second data store are in second intermediate state of synchronization;

obtain, upon ascertaining that the second record set received at the first data store and the second data store are in the second intermediate state of synchronization, identification information of each of the records in the second record set received at each of the first data store and the second data store; and determine, based on the identification information, a final state of synchronization between the first data store and the second data store, the final state of synchronization indicating whether the first data store and the second data store are in accordance with each other.

18. The non-transitory computer-readable medium of claim 17, wherein each record in the first record set has a corresponding first record timestamp indicating a time of reception of the corresponding record at the first data store, and wherein record in the second record set has a corresponding second record timestamp indicating a time of reception of the corresponding record at the first data store.

19. The non-transitory computer-readable medium of claim 18, wherein the computer-readable instructions cause the processing resource to:

determine, based on the first record timestamp associated with corresponding records in the first record set and the second record timestamp associated with corresponding records in the second record set, whether a record, from amongst the records in the first record set, was received at the first data store subsequent to derivation of a record from amongst the records in the second record set; and trigger, upon determining that the record was received subsequent to derivation of the record in the second record set, derivation of an updated record for the second record set, the updated record being derived based on the record received subsequent to derivation of the record in the second record set.

20. The non-transitory computer-readable medium of claim 17, wherein the computer-readable instructions cause the processing resource to compare the identification information, of each of the records in the second record set received at the first data store and the second data store, to ascertain reception of a unique record at one of the first data store and the second data store, the unique record being amongst the records in the second record set received by one of the first data store and the second data store and being missing at other of the first data store and the second data store.

* * * * *